(12) United States Patent
Rapien

(10) Patent No.: US 11,009,167 B2
(45) Date of Patent: May 18, 2021

(54) CONNECTING DEVICE FOR A FLUID SUPPLY SYSTEM

(71) Applicant: Compagnie Plastic Omnium, Lyons (FR)

(72) Inventor: Tony Rapien, Piedmont, SC (US)

(73) Assignee: Compagnie Plastic Omnium, Lyons (FR)

( * ) Notice: Subject to any disclaimer, the term of this patent is extended or adjusted under 35 U.S.C. 154(b) by 351 days.

(21) Appl. No.: 16/055,918

(22) Filed: Aug. 6, 2018

(65) Prior Publication Data
US 2020/0041057 A1 Feb. 6, 2020

(51) Int. Cl.
*F16L 37/50* (2006.01)
*F16L 37/02* (2006.01)

(52) U.S. Cl.
CPC .............. *F16L 37/50* (2013.01); *F16L 37/02* (2013.01)

(58) Field of Classification Search
CPC ......... F16L 37/50; F16L 37/02; F16L 41/001; F16L 27/02
USPC ..................................... 285/33, 136.1, 142.1
See application file for complete search history.

(56) References Cited

U.S. PATENT DOCUMENTS

| | | | | |
|---|---|---|---|---|
| 2,774,616 A | * | 12/1956 | Dodd ...................... | H01P 1/042 285/33 |
| 4,865,360 A | * | 9/1989 | Adams ..................... | F16K 11/20 285/142.1 |
| 8,434,318 B2 | * | 5/2013 | Kim .......................... | F25C 1/25 62/340 |
| 2008/0036199 A1 | * | 2/2008 | Asam ...................... | F16L 37/56 285/33 |

\* cited by examiner

*Primary Examiner* — Matthew Troutman
*Assistant Examiner* — Fannie C Kee
(74) *Attorney, Agent, or Firm* — St. Onge Steward Johnston & Reens, LLC

(57) ABSTRACT

Connecting device for a fluid supply system including a female connecting part and a male connecting part, wherein the female connecting part has a back support plate; a middle support plate; a front support plate; wherein the front support plate comprises a fluid outlet port intended to be connected to a corresponding connecting element of the male connecting part, and the back, middle and front support plates each comprising an outlet hole connected to the outlet port, wherein the middle support plate is fastened to the back support plate and the front support plate is fastened to the middle support plate; wherein the front support plate is configured to be able to move along a first axis, wherein the middle support plate is configured to be able to move along a second axis, the second axis being transverse to the first axis.

14 Claims, 3 Drawing Sheets

CONNECTING DEVICE FOR A FLUID SUPPLY SYSTEM

FIELD OF THE INVENTION

The invention relates to the field of connecting devices for feeding an air supply to a pneumatic system, such as a pneumatic system being part of an assembly station of a vehicle body part.

BACKGROUND OF THE INVENTION

To supply air to a pneumatic device of an assembly station in the automotive industry, it is well-known to connect the pneumatic device to the air supply using a tube, the nozzle of which is connected to a fluid outlet port of the air supply. To that end, it is required to align the nozzle with the port. Such an alignment is usually performed by a human operator that can manually place the nozzle in front of the port with enough precision, controlling the alignment with his eyesight.

However, in the context of the automotive industry, most of the assembly work is now performed in an automated way, using robots or other remote-controlled devices, in an effort to increase productivity. It is therefore desirable to avoid requiring the input of a human operator to connect the nozzle to the port. To that end, the port should be configured so that the insertion of a nozzle can be performed without requiring a high level of precision in the alignment of the nozzle with the port.

To invention aims to solve this problem by providing a connecting device for a fluid supply system comprising a female connecting part and a male connecting part, characterized in that the female connecting part comprises:
   a back support plate;
   a middle support plate;
   a front support plate;
   wherein said front support plate comprising a fluid outlet port intended to be connected to a corresponding connecting element of the male connecting part, and said back, middle and front support plate each comprising an outlet hole connected to the outlet part,
   wherein the middle support plate is fastened to the back support plate and the front support plate is fastened to the middle support plate;
   wherein the front support plate is configured to be able to move along a first axis,
   wherein the middle support plate is configured to be able to move along a second axis, the second axis being transverse to the first axis.

Owing to the fact that the front and middle support plate can move along two axes that are transverse to each other, they become floating plates that can be displaced relative to the back support plate in two different directions, i.e. they can be twisted and/or slightly displaced so that the male part can be inserted in the fluid outlet port without requiring a precise alignment between them. In other words, a tolerance in the alignment is thus provided. This allows for a robot or a remote-controlled device to insert the male part in the fluid outlet port and perform the connection, making the involvement of a human operator unnecessary.

SUMMARY OF THE INVENTION

In a preferred embodiment, the front support plate is bolted to the middle support plate using at least one bolt, the front support plate comprising a slotted hole extending along the first axis and wherein the middle support plate is bolted to the back support plate using at least one bolt, the middle support plate comprising a slotted hole extending along the second axis. This is a simple yet efficient configuration enabling the movement of the front and middle support plates along the first and second axes.

Preferably, the connecting device further comprises a support frame framing the back, middle and front support plate, wherein the middle support plate is connected to the support frame by at least two springs extending along the second axis, preferably four springs, and wherein the front support plate is connected to the support frame by at least two springs extending along the first axis, preferably four springs.

Using a support frame to hold the plates through springs allows for the middle and front plates to be forced back to their initial position after the connection is made.

In a preferred embodiment, for each spring, a spring support pin extending from the support frame through at least one of the coils of the spring and/or a holding ring surrounding at least one of the coils of the spring that is attached to the frame, so as to stabilize the spring.

In that way, the rings are prevented from shifting left and right and make the plates rotate in an undesirable fashion.

In a preferred embodiment, the first and second axes are perpendicular to each other. This is particularly suited to square-shaped plates which are easily integrated in a connecting device.

In a preferred embodiment, the female connecting part further comprises at least two guiding pins to guide the insertion of the male connecting part to the female connecting part, the male connecting part further comprising at least two corresponding guiding holes to receive the guiding pins, the holes being chamfered so as to facilitate inserting the pins inside the holes.

In a preferred embodiment, in the plane of the front support plate, the guiding pins are aligned with the fluid outlet port. The alignment helps avoiding an undesirable rotation of the plates.

In order to protect its parts, which is usually required in environments such as a vehicle part assembly plant, the connecting device preferably further comprises a protective housing covering the back, middle and front support plates and the guiding pins.

In a preferred embodiment, the protective housing is connected to the support frame and is configured to move relatively to the support frame along an insertion direction of the male connecting part into the female connecting part.

To increase the automation of the connecting device, the connecting device preferably further comprises a sensor able to detect that the female and the male connecting parts have been connected and/or disconnected.

In a particular embodiment, the female connecting part is connected to an air supply of a vehicle part assembly station.

In a particular embodiment, the male connecting part is connected to a vehicle part-assembly station.

BRIEF DESCRIPTION OF THE DRAWINGS

A particular non-limiting embodiment of the description will now be described using the attached figures on which.

DETAILED DESCRIPTION OF THE INVENTION

Figure 1:
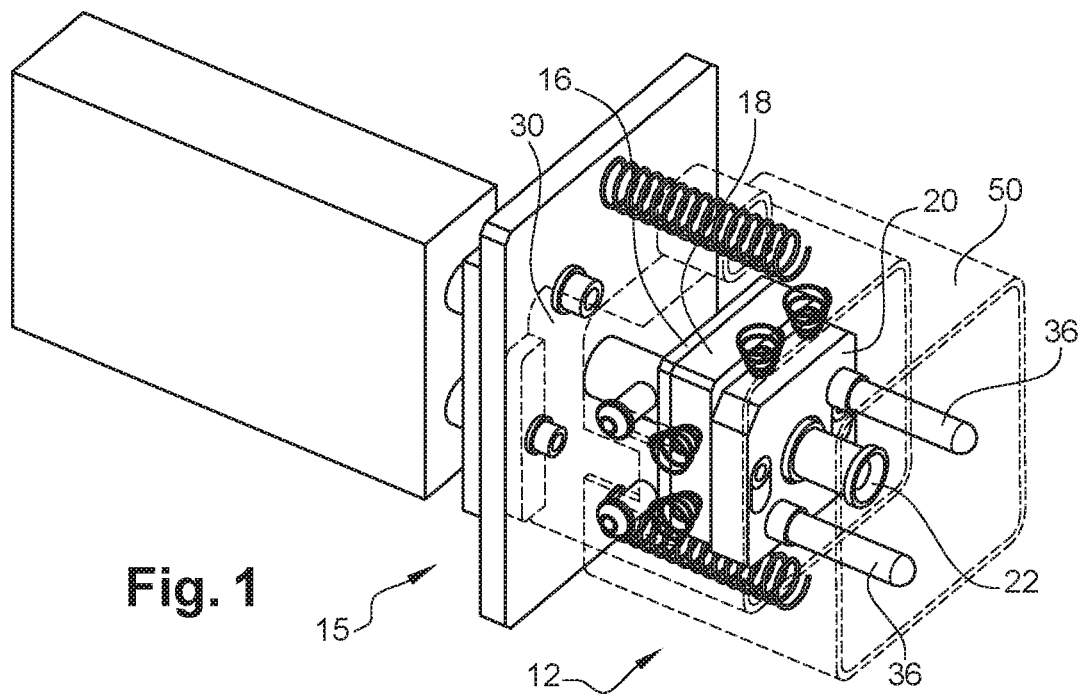
FIG. 1 is a perspective view of the female connecting part of a connecting device according to a preferred embodiment of the invention.
Figure 3:
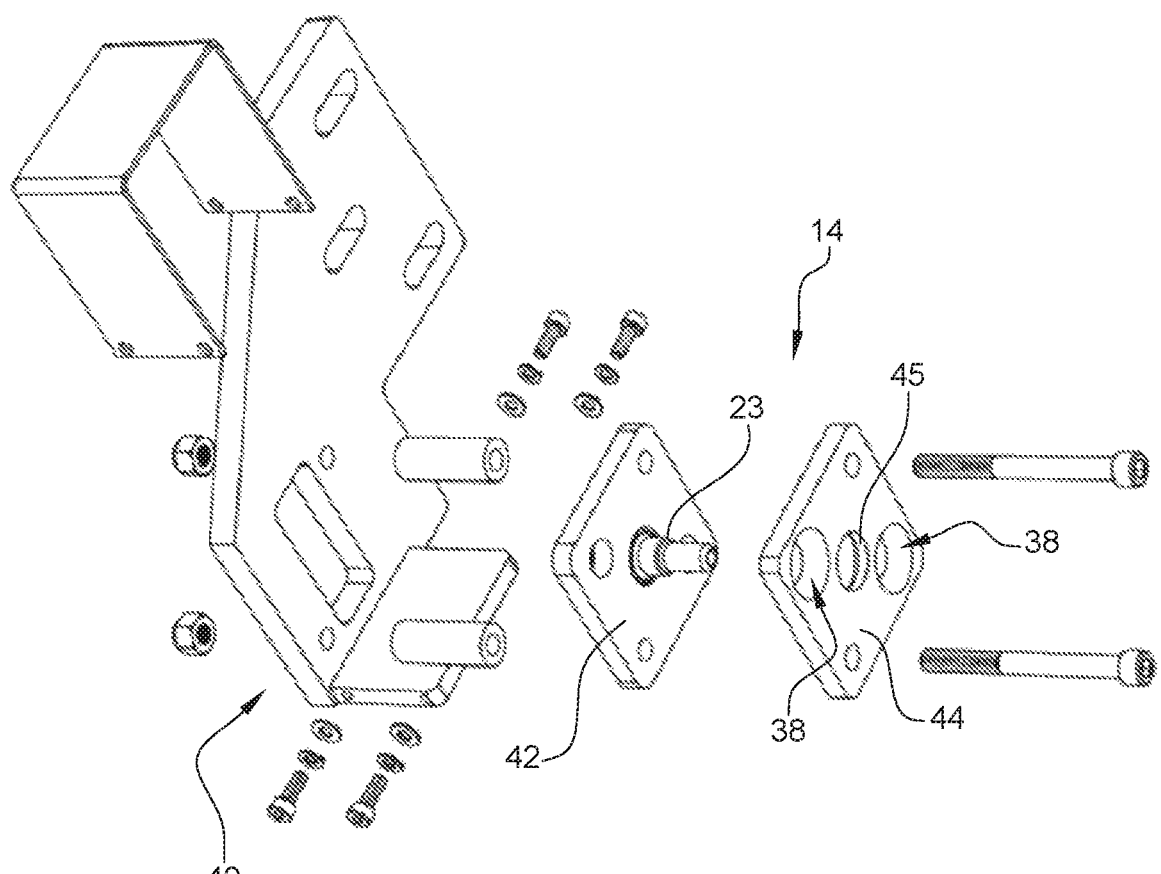
FIG. 3 is an exploded view of the male connecting part of a connecting device according to a preferred embodiment of the invention.
Figure 5:
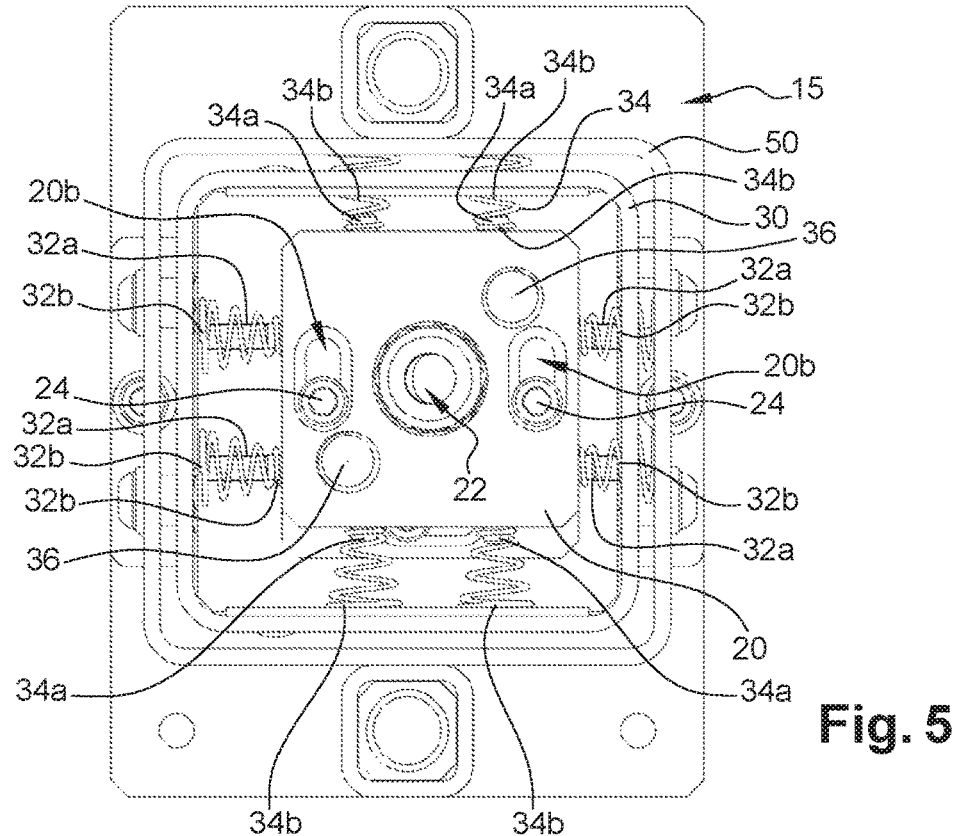
FIG. 5 is a front view of the connecting device of FIG. 1 in a second position.

Represented of FIG. 1 is a female connecting part 12 of a connecting device for a fluid supply system and a male connecting part 14 represented on FIG. 5. The male connecting part 14 is shown in an exploded view on FIG. 3.

In the preferred embodiment of the invention shown on the Figures, the connecting element of the female connecting part 12 is connected to an air supply system 15 of a vehicle part assembly station (not shown), whereas the male connecting part 14 is connected to said vehicle part assembly station.

The female connecting part 12 comprises a back support plate 16, a middle support plate 18 and a front support plate 20. Each of these plates has a substantially square shape, but of course other shapes can be considered, such as rectangular, round or even triangular shapes. Preferably all plates have the same size, that is, either the same side length in the case of a square or a triangle, or the same diameter in the case of a round plate.

Front support plate 20 comprises a fluid outlet port 22 connected to a corresponding connecting element 23 of the male connecting part 14. Fluid outlet port 22 is preferably arranged in the center of the front support plate 20.

The back 16, middle 18 and front 20 support plates each comprise an outlet hole 16a, 18a, 20a connected to the outlet port 22. Preferably, they are aligned along the direction of insertion of the male connecting part 14 into the female connecting part 12. Here, all outlet holes are formed in the center of the plates 16, 18, 20 and share a common center. Here, outlet holes 16a and 18a are circular while outlet hole 20a has a substantially square shape.

The middle support plate 18 is fastened to the back support plate 16 and the front support plate 20 is fastened to the middle support plate 18.

The front support plate 20 is bolted to the middle support plate 18 using two bolts 24. Notably, the front support plate 20 comprises two slotted holes 20b extending along a first axis Y-Y through which the bolts 24 go through, respectively. Thanks to this, the front support plate 20 is able to move along said first axis Y-Y.

Figure 2:
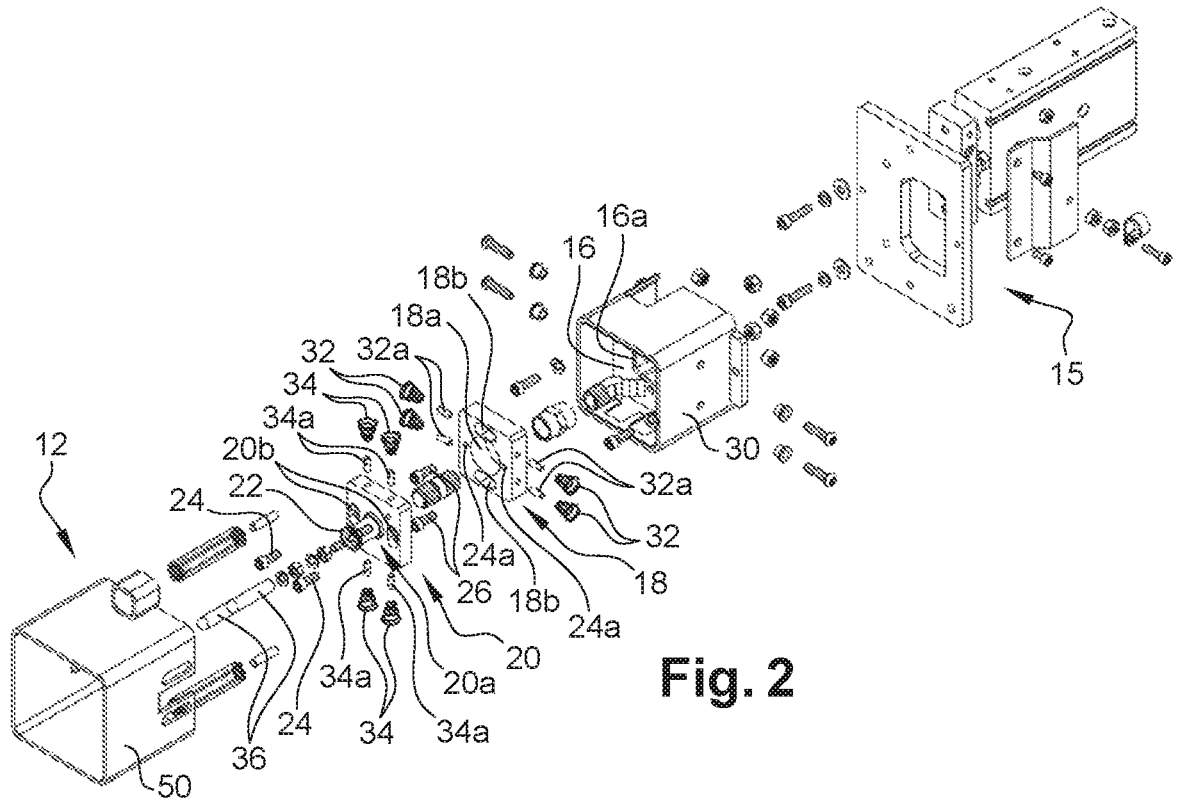
FIG. 2 is an exploded view of the connecting device of FIG. 1.

The first axis Y-Y here is substantially parallel to one of the sides of the front support plate 20. Taking into account the orientation of the front support plate 20 on FIGS. 2 and 3, first axis Y-Y corresponds to the vertical axis of the Figures. Bolts 24 are inserted into corresponding holes 24a borne by middle support plate 18.

Slotted holes 20b have a substantially oblong shape. They are preferably located on two opposite sides of the front support plate 20 in a symmetrical manner with respect to the outlet hole 20a.

In a similar manner, the middle support plate 20 is bolted to the back support plate 16 using two bolts 26. The middle support plate 16 comprises a slotted hole 16b extending along a second axis X-X through which the bolts 24 go through. Thanks to this, the front support plate 18 is able to move along said second axis X-X.

Slotted holes 16b have a substantially oblong shape. They are preferably located on two opposite sides of the front support plate 20 in a symmetrical manner with respect to the outlet hole 18a.

The middle support plate 16 is configured to be able to move along a second axis X-X. The second axis X-X is transverse to the first axis Y-Y. In the preferred embodiment as shown on the Figures, the first axis Y-Y and the second axis X-X are perpendicular to each other. As such, taking into account the orientation of the front support plate 20 on FIGS. 2 and 3, second axis X-X corresponds to the horizontal axis of the Figures.

Owing to the fact that the front 20 and middle support plate 18 can move along two axes that are transverse to each other, they become floating plates that can be displaced relative to the back support plate 16 in two different directions, i.e. they can be twisted and/or slightly displaced so that the male part 14 can be inserted in the fluid outlet port 22 without requiring a precise alignment between the two of them.

The connecting device also comprises a support frame 30 framing the back 16, middle 18 and front 20 support plates. Considering the square frame of the support plates 16, 18, 20, the support frame is a hollow square cuboid frame.

The middle support plate 18 is connected to the support frame 30 by at least two springs extending along the same axis as the slotted hole 18b, i.e. along to the second axis X-X. In the preferred embodiment shown on the Figures, the middle support plate 18 is connected to the support frame 30 by four horizontal springs 32.

In the same way, the front support plate 20 is connected to the support frame 30 by at least two springs extending along the same axis as the slotted hole 20b, i.e. along to the first axis Y-Y. In the preferred embodiment shown on the Figures, the front support plate 20 is connected to the support frame by four vertical springs 34.

The support frame 30 comprises, for each spring 32, 34, a corresponding spring support pin 32a, 34a extending from the support frame 30 through at least one of the coils of the spring 32, 34, so as to stabilize the spring 32, 34, for example the first coil or the first two coils. In addition, the support frame 30 comprises, for each spring 32, 34, a holding ring 32b, 34b surrounding at least one of the coils of the spring 32, 34 that is attached to the frame 30, for example the first coil, so as to stabilize the spring 32, 34.

Figure 4:
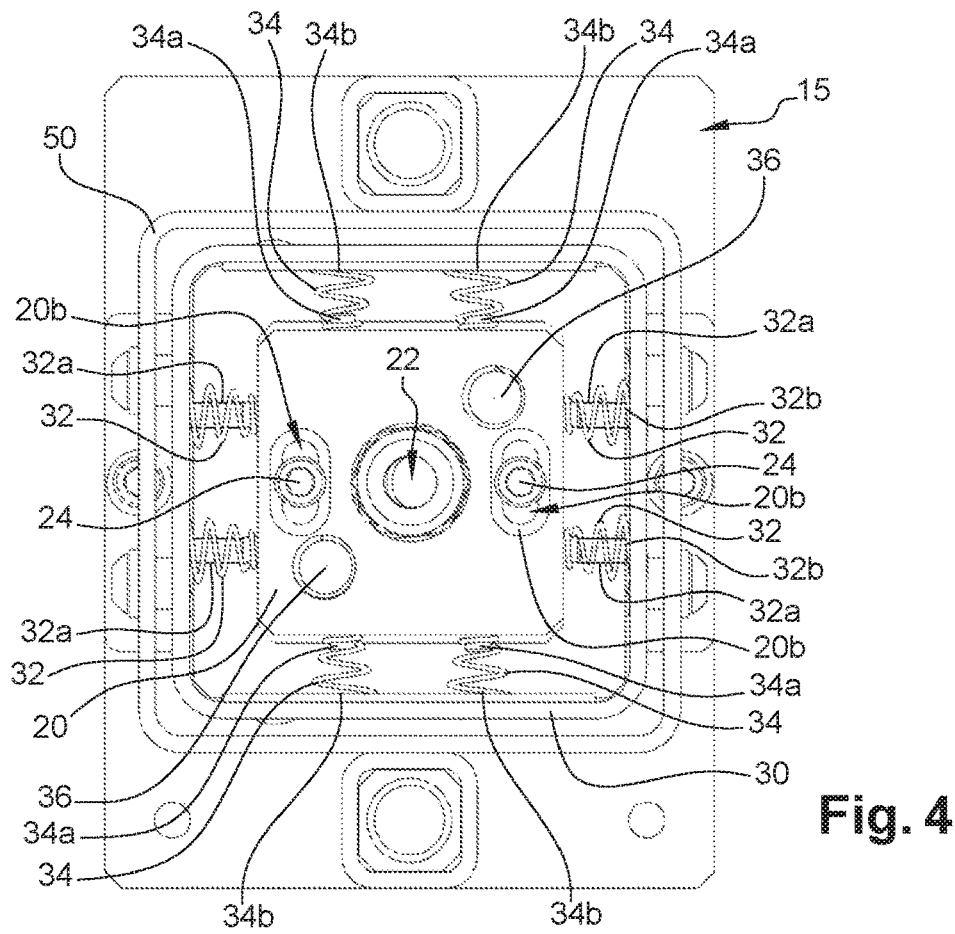
FIG. 4 is a front view of the connecting device of FIG. 1 in a first position.

As shown on FIGS. 4 and 5, owing to the fact that the front support plate 20 and the middle support plate 18 are connected to each other, to the back support plate 16 and to the support frame 30 in the way described above, the fluid outlet port 22 can be displaced in the plane containing both axes X-X and Y-Y as much as the springs allow it.

FIG. 4 illustrates a so-called neutral position, or resting position, in which the springs 32, 24 are at rest. In this resting position, both middle support plates 18 and front support plates 20 are centered within the support frame 30.

FIG. 5 illustrates an extreme position in which the middle support plate 18 and front support plate 20 have both been displaced along the X-X and Y-Y axes, respectively, as much as the springs 32, 34 allow them.

As will be understood, the middle support plate 18 and front support plate 20 can take any position in the plane containing both the X-X and Y-Y axes, within the limits defined by the tension and length of the springs 32, 34.

As such, a misalignment between the male connecting part 14 and the female connecting part 12 can be tolerated.

For example, when the male connecting part 14 is placed before the female connecting part 12, it can be inserted into the female connecting part 12 even if the male connecting element 23 is not aligned with the center of the fluid outlet port 22, for instance should it be slightly displaced to the right, the middle support 18 and front support plates 20 can be slightly displaced to the right.

The female connecting part 12 further comprises two guiding pins 36 to guide the insertion of the male connecting part 14 to the female connecting part 12. In the preferred embodiment shown on the Figures, the two guiding pins 36 extend from the front support plate 20, away from the front support plate 20, in a direction that is substantially perpendicular to the plane of the front support plate 20.

Preferably, the guiding pins 36 extend from two opposite corners of the front support plates 20. Even more preferably, the guiding pins 36 and the outlet port 22 are aligned in the plane of the front support plate 20.

The male connecting part 14 comprises two corresponding guiding holes 38 to receive the guiding pins 36, the guiding holes 38 being chamfered so as to facilitate inserting the pins 36 inside the guiding holes 38.

More particularly, the male connecting part 14 comprises a male body 40 to which is attached a male holding plate 42 from which the male connecting element 23 projects. Much like the female plates 16, 18, 20, the male holding plate is square-shaped, but other shapes could be considered.

The male connecting part 14 further comprises a male front plate 44, bolted to the male holding plate 42. The male holding plate 42 bears the male connecting element 23 from which it extends from. The male front plate 44 also has a square shape in the present preferred embodiment. The guiding holes 38 are borne by the male front plate 44. Preferably, the guiding holes are located on two opposite corners of the male front plate 44. The male front plate 44 also bears a central hole 45 to receive the male connecting element 23.

The connecting device, in particular the female connecting part 12, also comprises a protective housing 50 covering the back 16, middle 18 and front support 20 plates and the guiding pins 36. Considering the square frame of the support plates 16, 18, 20, the protective housing is a hollow square cuboid frame.

The protective housing 50 extends on one side at least from the back support plate 16 to, on the other side, at least the free end of the guiding pin 16.

The protective housing 50 is connected to the support frame 30 and is configured to move relatively to the support frame 30 along an insertion direction of the male connecting part 14 into the female connecting part 12.

Optionally, the connecting device further comprises a sensor (not shown) able to detect that the female 12 and the male 14 connecting parts have been connected and/or disconnected.

The invention is not limited to the described embodiments and other embodiments shall clearly appear to the skilled person in the art.

What is claimed is:

1. A connecting device for a fluid supply system comprising a female connecting part and a male connecting part, wherein the female connecting part comprises:
a back support plate;
a middle support plate;
a front support plate;
wherein said front support plate comprises a fluid outlet port intended to be connected to a corresponding connecting element of the male connecting part, and said back, middle and front support plates each comprising an outlet hole connected to the outlet port,
wherein the middle support plate is fastened to the back support plate and the front support plate is fastened to the middle support plate;
wherein the front support plate is configured to be able to move along a first axis,
wherein the middle support plate is configured to be able to move along a second axis, the second axis being transverse to the first axis;
wherein the connecting device further comprises a support frame framing the back, middle and front support plates, wherein the middle support plate is connected to the support frame by at least two springs extending along the second axis.

2. The connecting device according to claim 1, wherein the front support plate is bolted to the middle support plate using at least one bolt, the front support plate comprising a slotted hole extending along the first axis and wherein the middle support plate is bolted to the back support plate using at least one bolt, the middle support plate comprising a slotted hole extending along the second axis.

3. The connecting device according to claim 1, wherein each spring comprises at least one coil and wherein the support frame comprises, for each spring, a spring support pin extending from the support frame through the at least one of the coils of the spring.

4. The connecting device of claim 3, wherein the support frame comprises, for each spring, a holding ring surrounding at least one of the coils of the spring that is attached to the frame, so as to stabilize the spring.

5. The connecting device according to claim 1, wherein the first and second axes are perpendicular to each other.

6. The connecting device according to claim 1, wherein the female connecting part further comprises at least two guiding pins to guide the insertion of the male connecting part to the female connecting part, the male connecting part further comprising at least two corresponding guiding holes to receive the at least two guiding pins, the at least two guiding holes being chamfered so as to facilitate inserting the at least two guiding pins inside the holes.

7. The connecting device according to claim 6, wherein, in a plane of the front support plate, the at least two guiding pins are aligned with the fluid outlet port.

8. The connecting device according to claim 6, wherein the connecting device further comprises a protective housing covering the back, middle and front support plates and the at least two guiding pins.

9. The connecting device according to claim 6, wherein the connecting device further comprises a protective housing covering the back, middle and front support plates and the at least two guiding pins and the protective housing is connected to the support frame and is configured to move relatively to the support frame along an insertion direction of the male connecting part into the female connecting part.

10. The connecting device according to claim 1, wherein the female connecting part is configured to be connected to an air supply of a vehicle part assembly station.

11. The connecting device according to claim 10, wherein the male connecting part is configured to be connected to a vehicle part assembly station.

12. The connecting device according to claim 1, wherein the middle support plate is connected to the support frame by four springs extending along the second axis.

13. The connecting device according to claim 1, wherein the front support plate is connected to the support frame by four springs extending along the first axis.

14. The connecting device of claim 1, wherein each spring comprises at least one coil and wherein the support frame comprises, for each spring, a holding ring surrounding at least one of the coils of the spring that is attached to the frame, so as to stabilize the spring.

\* \* \* \* \*

UNITED STATES PATENT AND TRADEMARK OFFICE
CERTIFICATE OF CORRECTION

PATENT NO. : 11,009,167 B2  
APPLICATION NO. : 16/055918  
DATED : May 18, 2021  
INVENTOR(S) : Tony Rapien Page 1 of 1

It is certified that error appears in the above-identified patent and that said Letters Patent is hereby corrected as shown below:

On the Title Page

Item [71]:
"Compagnie Plastic Omnium, Lyons"
Should read:
-- Compagnie Plastic Omnium, Lyon --

Signed and Sealed this  
Twenty-ninth Day of June, 2021

Drew Hirshfeld  
*Performing the Functions and Duties of the*  
*Under Secretary of Commerce for Intellectual Property and*  
*Director of the United States Patent and Trademark Office*